Patented Feb. 13, 1934

1,947,237

UNITED STATES PATENT OFFICE 1,947,237

PROCESS OF MANUFACTURE OF UNFERMENTABLE FRUIT JUICES

Silvere Cyril Vandecaveye, Pullman, Wash., assignor to State College of Washington, Pullman, Wash.

No Drawing. Substitute for application Serial No. 447,782, April 26, 1930. This application March 6, 1933. Serial No. 659,831

2 Claims. (Cl. 99—11)

This invention is for improvements in and relating to the manufacture of unfermentable fruit juices from saps or juices derived from any or all edible fruits containing carbohydrates that may be fermented into ethyl alcohol by the action of yeasts.

Various attempts have been made at rendering fruit juices unfermentable by pasteurization, sterilization by heat, refrigeration, or the addition of chemical preservatives but no satisfactory method has hitherto been devised for the removal from the fruit juices of the mineral food supplies essential for the growth and reproduction of the yeasts that cause alcoholic fermentation of fruit juices.

Instead of depending solely upon the agencies of pasteurization, sterilization by heat, refrigeration, or the addition of chemical preservatives, I employ, to assist in rendering fruit juices unfermentable, successive inoculations of the fruit juices with yeasts or yeast suspensions to remove from the fruit juices practically all the nitrogen and phosphorus, both of which are essential elements for the growth and reproduction of the yeasts that cause the production of ethyl alcohol in the fruit juices by the process of fermentation.

The characteristic feature of the process resides in allowing to grow and multiply until ethyl alcohol is just beginning to be formed, the yeasts naturally present in the fruit juices, or those derived from cultures isolated from fruits or any other substances containing yeasts capable of producing ethyl alcohol, and introduced into the fruit juices by inoculation. Cultures thus isolated are hereinafter designated as "yeast culture." The yeasts developed in this manner in the fruit juices and hereinafter designated as "generation of yeasts," are then prevented from further development by heating the fruit juices so treated at 40° C. or above for 20 minutes or more. The heating also causes the precipitation of the yeast cells which have already consumed a large part of the nitrogen and phosphorus contained in the fruit juices under treatment. The precipitate thus formed is then separated and removed by decantation or siphoning of the supernatant fruit juice.

Further removal of the nitrogen and phosphorus remaining in the decanted or siphoned fruit juice is secured by subsequent inoculations with fruit juices naturally containing yeasts capable of producing ethyl alcohol, or with suspensions of yeast culture, allowing the yeasts thus introduced to grow and multiply until ethyl alcohol is just beginning to be formed. These yeasts, which may be conveniently referred to as the second generation of yeasts, are then prevented from further development by heating, precipitating, and decanting or siphoning, according to the specifications described for the first generation of yeasts. Inoculation, heating, precipitation, and decantation or siphoning is repeated according to the specifications for the preceding generations of yeast until only traces of nitrogen and phosphorus remain in the fruit juices. Usually three inoculations, heatings, precipitations, and decantations or siphonings are sufficient to remove from the fruit juices all but traces of nitrogen and phosphorus.

When all but traces of the nitrogen and phosphorus are thus removed from the fruit juices the production of ethyl alcohol by yeasts is virtually impossible for the simple reason that the two elements, nitrogen and phosphorus, are required in perceptible quantities for the growth, reproduction, and activity of yeasts. Consequently, by the use of this process the fruit juices are said to be "immunized" or "vaccinated" against yeasts that cause the production of ethyl alcohol, and the total amount of ethyl alcohol produced in fruit juices may be controlled to as low and lower than 0.5 of one per cent.

It may be remarked that the underlying principle of this process consists in the removal of all but traces of the nitrogen and phosphorus contained in fruit juices by means of inoculation, growth, and removal of successive generations of yeasts. Obviously the traces of nitrogen and phosphorus together with the living yeast cells remaining in the fruit juices after this process or principle has been carried to completion may be responsible for the production of limited, small amounts of ethyl alcohol in the fruit juices following storage for a certain period of time. This possible production of ethyl alcohol may be prevented completely by passing the processed fruit juices through any filter that will retain all the yeast cells or by adding to the processed fruit juices 0.4 of one per cent sodium benzoate previous to finally placing the unfermentable fruit juice into containers for storage of the product.

The following is an example of a convenient mode of procedure for the production of unfermentable fruit juices by the described process using the principle of inoculation with, and growth and removal of, successive generations of yeasts:

1. Inoculate freshly pressed fruit juice with two per cent of a convenient suspension of yeast culture.

2. Keep or incubate the inoculated fruit juice at 25° C. and allow the yeast to develop until foam bubbles indicate carbon dioxide production, and consequently the beginning of ethyl alcohol formation.

3. Check further development of the yeasts by heating the fruit juice at 45° C. for 30 to 40 minutes, cool to 25° C., allow the precipitates to settle, and siphon the supernatant fruit juice.

4. Take the siphoned supernatant fruit juice and repeat the inoculation, incubation, heating, and siphoning as described above a second and a third time.

5. Following the third inoculation, incubation, heating, and siphoning of the fruit juice, add sodium benzoate at the rate of 0.4 of one per cent, mix thoroughly, and place the processed juice in suitable containers, or, instead of adding sodium benzoate, pass the processed fruit juice through any filter that will retain all the yeast cells and collect the filtrate immediately in containers previously sterilized against yeasts, filling these containers to the top to exclude the air from the fruit juice.

6. Immediately after filling containers with the filtered or the sodium benzoate treated fruit juice, close them with stoppers or caps previously sterilized against microorganisms to prevent possible bacterial and mold growth that may result from unsterilized stoppers or caps. This application is a substitute for application Serial No. 447,782, filed April 26, 1930.

I claim:

1. The process which comprises treating saps and juices from edible fruits by means of generations of yeasts derived from the yeast naturally present in such fruits as follows: (1) keeping the saps and juices from edible fruits at any temperature favorable for yeast development, allowing such development to proceed until foam bubbles indicate carbon dioxide production and consequently the beginning of ethyl alcohol formation; (2) checking further development of the yeasts and precipitating them by heating the above mentioned saps and fruit juices at and above 45° C. for 30 to 40 minutes and then cooling them to 25° C. for the purpose of promoting a new generation of yeast by means of inoculation with fresh saps and fruit juices from edible fruits; (3) allowing the precipitates of the above treated saps and fruit juices to settle, and separating the clearer from the settled portion of these saps and fruit juices; (4) repeating inoculation, precipitation, and separation of the clearer from the precipitated portion of the saps and fruit juices as above described for the purpose of removing substantially all nitrogen and phosphorus therefrom.

2. Treating saps and juices from edible fruits with yeasts derived from cultures as follows: (1) inoculating the above mentioned saps and fruit juices with yeast culture and keeping such inoculated saps and fruit juices at any temperature favorable for yeast development, allowing such development to proceed until foam bubbles indicate carbon dioxide production and consequently the beginning of ethyl alcohol formation; (2) checking further development of these yeasts and precipitating them by heating the above mentioned saps and fruit juices at and above 45° C. for 30 to 40 minutes and then cooling them to 25° C. for the purpose of promoting a new generation of yeast by means of inoculation with yeast culture; (3) allowing the precipitates of the above treated saps and fruit juices to settle, and separating the clearer from the settled portion of these saps and fruit juices; (4) repeating inoculation, precipitation, and separation of the clearer from the precipitated portion of the saps and fruit juices as above described for the purpose of removing substantially all nitrogen and phosphorus therefrom.

SILVERE CYRIL VANDECAVEYE.